(12) United States Patent
Mathur et al.

(10) Patent No.: US 12,456,514 B2
(45) Date of Patent: Oct. 28, 2025

(54) BURIED METAL TECHNIQUES

(71) Applicant: Arm Limited, Cambridge (GB)

(72) Inventors: Rahul Mathur, Austin, TX (US);
Mudit Bhargava, Austin, TX (US)

(73) Assignee: Arm Limited, Cambridge (GB)

( * ) Notice: Subject to any disclaimer, the term of this patent is extended or adjusted under 35 U.S.C. 154(b) by 83 days.

(21) Appl. No.: 17/874,611

(22) Filed: Jul. 27, 2022

(65) Prior Publication Data

US 2024/0038297 A1    Feb. 1, 2024

(51) Int. Cl.
*G11C 11/419*     (2006.01)
*G11C 11/412*     (2006.01)
*H10B 10/00*     (2023.01)

(52) U.S. Cl.
CPC .......... *G11C 11/419* (2013.01); *G11C 11/412* (2013.01); *H10B 10/12* (2023.02)

(58) Field of Classification Search
CPC ..... G11C 11/419; G11C 11/412; G11C 5/063; H10B 10/12
See application file for complete search history.

(56) References Cited

U.S. PATENT DOCUMENTS

| | | |
|---|---|---|
| 9,997,217 B1 | 6/2018 | Goel et al. |
| 10,854,280 B2 | 12/2020 | Singh et al. |
| 2006/0019488 A1* | 1/2006 | Liaw ...................... H10B 10/00 257/E27.099 |
| 2020/0082876 A1* | 3/2020 | Singh ..................... H10B 10/00 |
| 2020/0373240 A1* | 11/2020 | Vadi ..................... H01L 23/5286 |
| 2023/0122564 A1* | 4/2023 | Raj ........................ G11C 11/418 365/154 |
| 2023/0274769 A1* | 8/2023 | Akkaya ................. H10B 10/18 |

OTHER PUBLICATIONS

Mathur, et al.; Buried Interconnects for Sub-5 nm SRAM Design; IEEE Transactions on Electron Devices; vol. 69, Issue 3; pp. 1-41-1-47; Mar. 2022.
Chang, et al.; A 5-nm 135-Mb SRAM in EUV and High-Mobility Channel FinFET Technology With Metal Coupling and Charge-Sharing Write-Assist Circuitry Schemes for High-Density and Low-VMIN Applications; IEEE Journal of Solid-State-Circuits; vol. 56, No. 1; pp. 79-187; Jan. 2021.
Mathur, et al.; Buried Bitline for Sub-5nm SRAM Design; 2020 IEEE International Electron Devices Meeting (IEDM); pp. 20.2.1-20.2.4; Dec. 2020.

(Continued)

*Primary Examiner* — Jerome Leboeuf
(74) *Attorney, Agent, or Firm* — Pramudji Law Group PLLC; Ari Pramudji

(57) ABSTRACT

Various implementations described herein are related to a device having bitline drivers coupled to passgates of bitcells via bitlines and buried metal lines formed within a substrate including a buried enable signal line and a buried ground line coupled to ground connections of the bitline drivers. The buried enable signal line transfers a negative bias to a selected bitline of the bitlines via the buried ground line that is coupled to the ground connections of the bitline drivers so as to increase gate-source bias of the passgates of the selected bitcell to thereby enhance write capability of the selected bitcell.

14 Claims, 7 Drawing Sheets

(56) References Cited

OTHER PUBLICATIONS

Prasad, et al.; Buried Power Rails and Back-side Power Grids: Arm® CPU Power Delivery Network Design Beyond 5nm; 2019 IEEE International Electron Devices Meeting (IEDM); pp. 19.1.1-19.1.4; Dec. 2019.
Gupta, et al.; High-Aspect-Ratio Ruthenium Lines for Buried Power Rail; 2018 IEEE International Interconnect Technology Conference (IITC); pp. 4-6; Jun. 2018.
Chava, et al.; DTCO Exploration for Efficient Standard Cell Power Rails; Proc. SPIE 10588, Design-Process-Technology Co-optimization for Manufacturability XII; Mar. 2018. DOI: 10.1117/12.2293500.
Bhargava, et al.; Low VMIN 20nm Embedded SRAM with Multi-voltage Wordline Control based Read and Write Assist Techniques; 2014 Symposium on VLSI Circuits Digest of Technical Papers; Jun. 2014.
Chang, et al; A 20nm 112Mb SRAM in High-K Metal-Gate with Assist Circuitry for Low-Leakage and Low-VMIN Applications; 2013 IEEE International Solid-State Circuits; pp. 179-187; Mar. 2013.

\* cited by examiner

BURIED METAL TECHNIQUES

BACKGROUND

This section is intended to provide information relevant to understanding the various technologies described herein. As the section's title implies, this is a discussion of related art that should in no way imply that it is prior art. Generally, the related art may or may not be considered prior art. It should therefore be understood that any statement in this section should be read in this light, and not as any admission of prior art.

In some memory architecture designs, conventional power rails can be buried in memory, wherein metal power lines can be buried in the substrate, and these lines can be used as power rails for voltage distribution from backside circuitry. However, in these conventional memory designs, memory cells typically use frontside power rails for voltage distribution to frontside circuitry including the memory cells. Unfortunately, conventional memory designs are inefficient in that use of frontside power rails for memory cells suffers from area penalty in some fabrication. Thus, there exists a need to improve conventional memory designs to improve area efficiency of modern memory architecture.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to improving robustness of memory by utilizing capacitive effects from buried metals, wherein various buried metal techniques described herein are utilized to improve memory performance and robustness through use of capacitive coupling and/or charge sharing effects of buried metals.

Various implementations described herein are directed to memory architecture having a power distribution network (PDN) with buried power supply rails in physical layout design. The various schemes and techniques described herein provide for utilizing buried metal technology that is available for logic design to form and dispose buried metal parallel to bitlines, wherein capacitive coupling from buried metal to bitlines temporarily generates negative gate-to-source voltage (Vgs) at the bitcell passgate to improve the writability of the bitcell. Also, the various schemes and techniques described herein provide for using buried metal technology to form and dispose buried metal parallel to wordlines, wherein capacitive coupling from buried metal to wordlines may temporarily boost wordline voltage beyond the supply voltage level so as to improves writability of bitcells.

Various implementations of memory architecture with improved robustness by utilizing the capacitive effects of buried metal along with various schemes and techniques associated therewith will be described herein with reference to FIGS. 1-4B.

Figure 1:
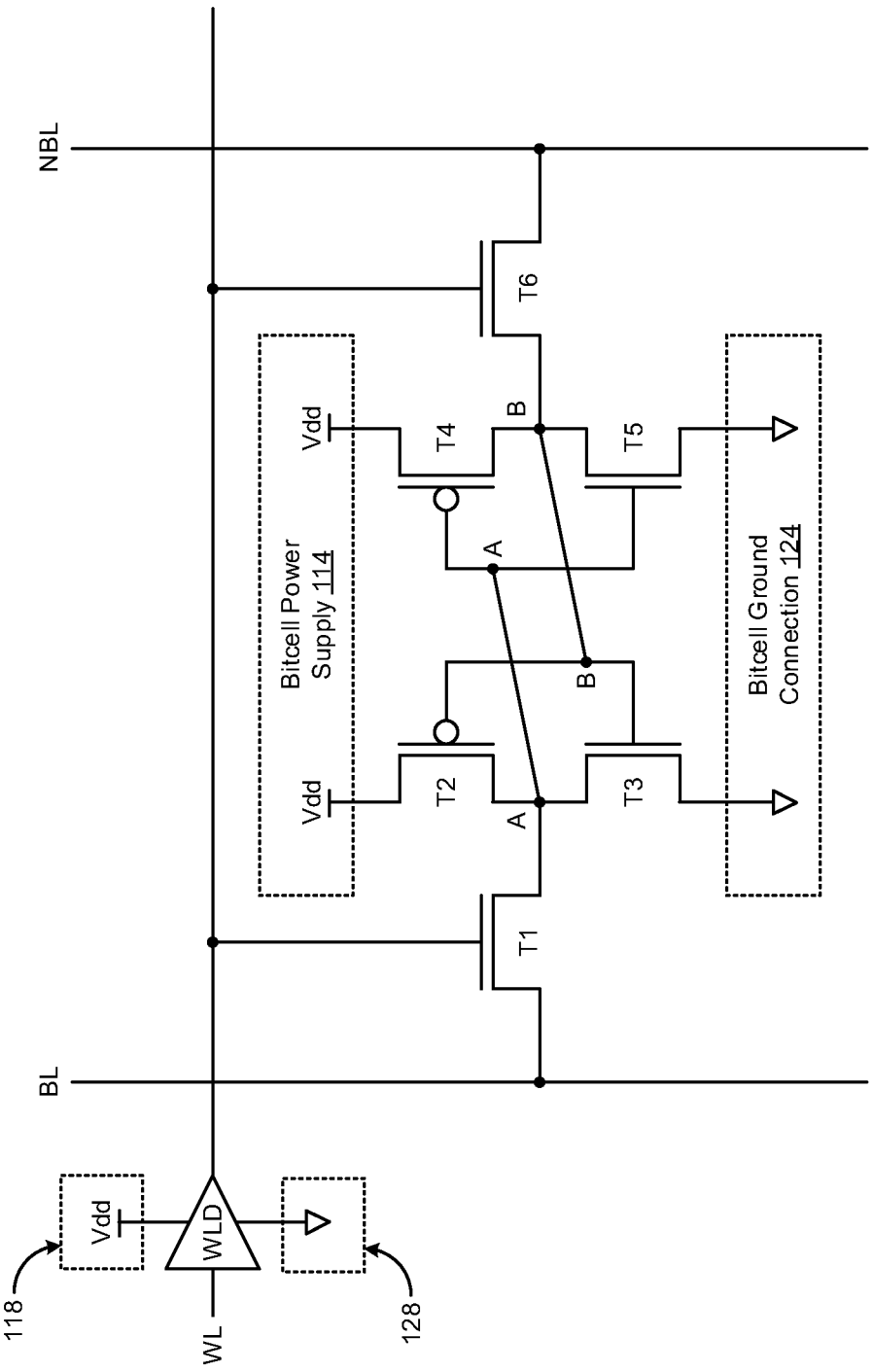
FIG. 1 illustrates a diagram of bitcell architecture in accordance with various implementations described herein.

FIG. 1 illustrates a diagram 100 of bitcell architecture 104 in accordance with various implementations described herein.

In some implementations, the bitcell architecture 104 may be implemented as a system or a device having various integrated circuit (IC) components that are arranged and coupled together as an assemblage or combination of parts that provide for physical circuit designs and various related structures. In some instances, a method of designing, providing and building the bitcell architecture 104 as an integrated system or device may involve use of various IC circuit components described herein so as to thereby implement fabrication schemes and techniques associated therewith. Further, the bitcell architecture 104 may be integrated with computing circuitry and related components on a single chip, and the bitcell architecture 104 may be implemented in various embedded systems for automotive, electronic, mobile, server and Internet-of-things (IoT) applications.

As shown in FIG. 1, the bitcell architecture 104 may include a multi-transistor bitcell structure, such as, e.g., a six-transistor (6T) static random access memory (SRAM) bitcell structure. In some instances, the six-transistors (6T) may include multiple (e.g., 4) N-type metal-oxide-semiconductor (NMOS) transistors along with multiple (e.g., 2) P-type MOS (PMOS) transistors. Passgate transistor (T1) may be coupled between a first bitline (BL/FBL) and node (A), and passgate transistor (T6) may be coupled between a second bitline (NBL/NFBL) and node (B) that is complementary to the first bitline (BL/FBL). Also, the wordline (WL) may be coupled to gates of transistors (T1, T6) to access data stored in a latch formed by transistors (T2, T3, T4, T5) via the wordline (WL) and bitlines (BL/FBL, NBL/NFBL). Also, transistors (T2, T3) may be coupled in series between voltage supply (Vdd) and ground (Vss or Gnd), wherein node (A) is formed between pull-up transistor (T2) and pull-down transistor (T3). Transistors (T4, T5) may be coupled in series between voltage supply (Vdd) and ground (Vss or Gnd), wherein node (B) is formed between pull-up transistor (T4) and pull-down transistor (T5). Also, transistors (T2, T3) may be cross-coupled with transistors (T4, T5) such that node (A) is coupled to the gates of transistors (T4, T5) and such that node (B) is coupled to the gates of transistors (T2, T3).

In some implementations, the bitcell architecture 104 has bitcell power supply connections 114 that are coupled to the Vdd input of transistors (T2, T4), and the bitcell architecture 104 has bitcell ground connections 124 that are coupled to a grounded Vss output of transistors (T3, T5). As shown in FIG. 1, transistor (T2) may be coupled between voltage supply (Vdd) and node (A), and transistor (T4) may be coupled between voltage supply (Vdd) and node (B). Also, the bitcell architecture 104 has a wordline driver (WLD) that is coupled to gates of passgate transistors (T1, T6) via the wordline (WL), and the bitcell architecture 104 has a WLD ground connection 128 that is coupled to a grounded Vss output of the wordline drivers (WLD). Also, the bitcell architecture 104 has WLD power supply connections 118 that are coupled to the Vdd input (or power supply connection) of the wordline driver (WLD), and also, the wordline driver (WLD) is coupled between Vdd and ground (Vss, Gnd).

In various implementations, the bitlines include a first bitline (BL) and a second bitline (FBL) that is a compliment to the first bitline (BL). In various instances, transistors (T2, T4) may refer to P-type field-effect transistors (PFET), and transistors (T1, T3, T5, T6) may refer to N-type FET (NFET) transistors. However, various other configurations may be used to achieve similar results, behavior and/or characteristics.

The bitcell architecture 104 may be implemented with one or more core arrays of bitcells or memory cells, wherein each bitcell may be configured to store at least one data-bit value (e.g., data value related to a logical '0' or '1'). The one or more core arrays may include any number of bitcells arranged in various configurations, such as, e.g., two-dimensional (2D) memory arrays having any number of columns and any number of rows of multiple bitcells, which may be arranged in a 2D grid pattern for read and write memory access operations. However, even though SRAM bitcell structure is shown and described in FIG. 1, various other types of bitcell structures may be used to achieve similar results of the various bitline precharging schemes and techniques described herein.

Figure 2A:
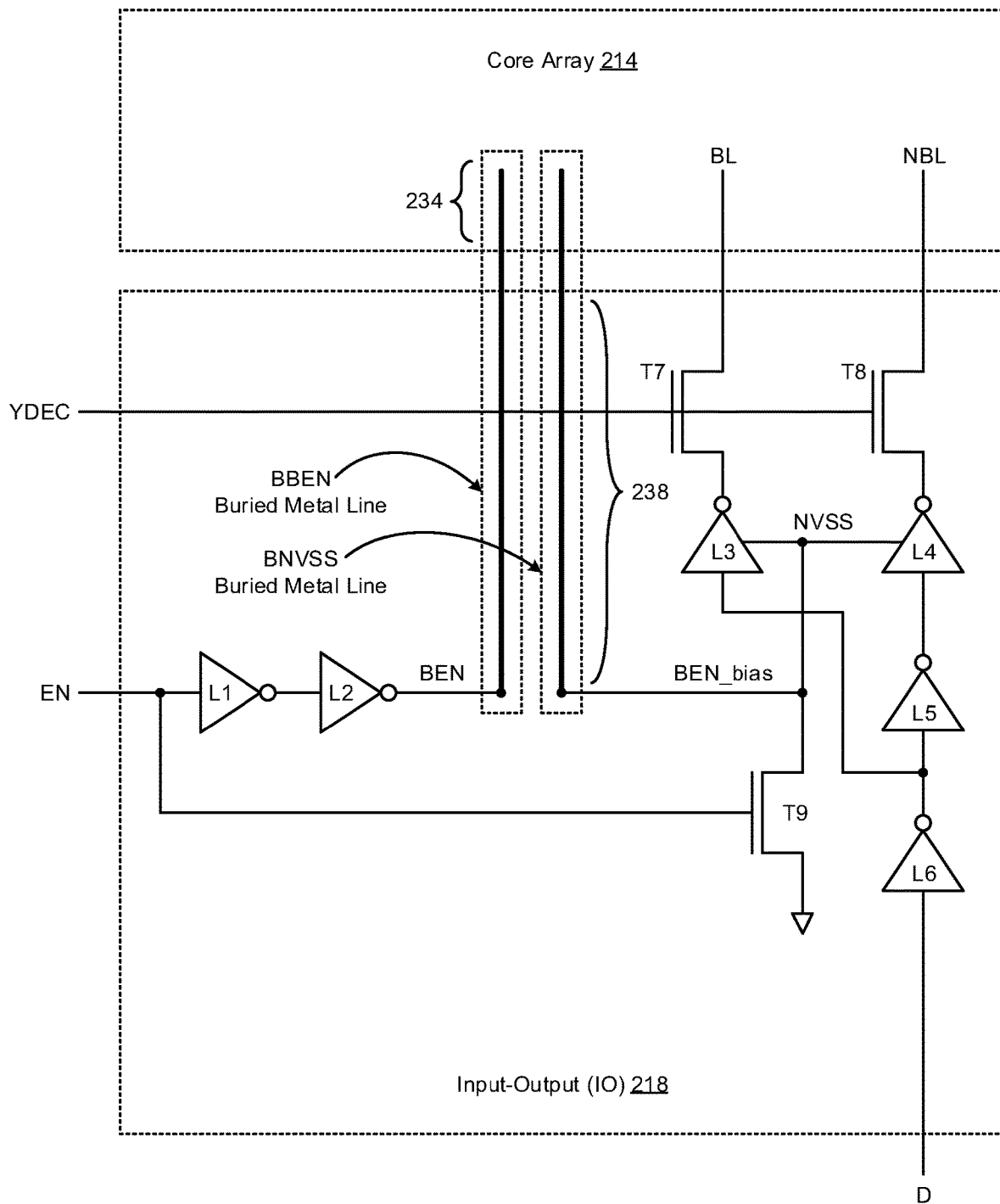
FIGS. 2A-2C illustrate diagrams of buried metal architecture that uses buried metal coupling capacitance in accordance with implementations described herein.
Figure 2B:
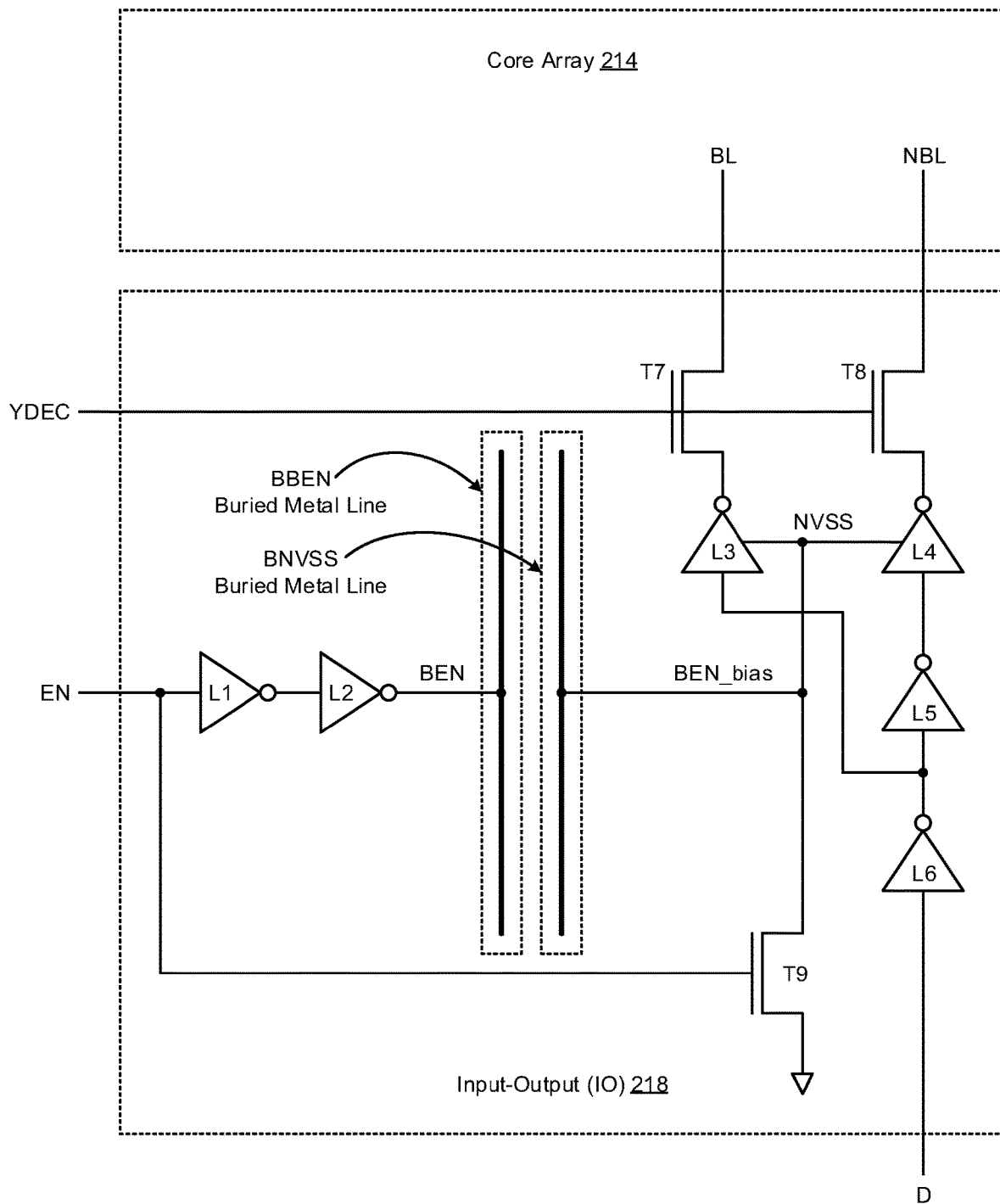
Figure 2C:
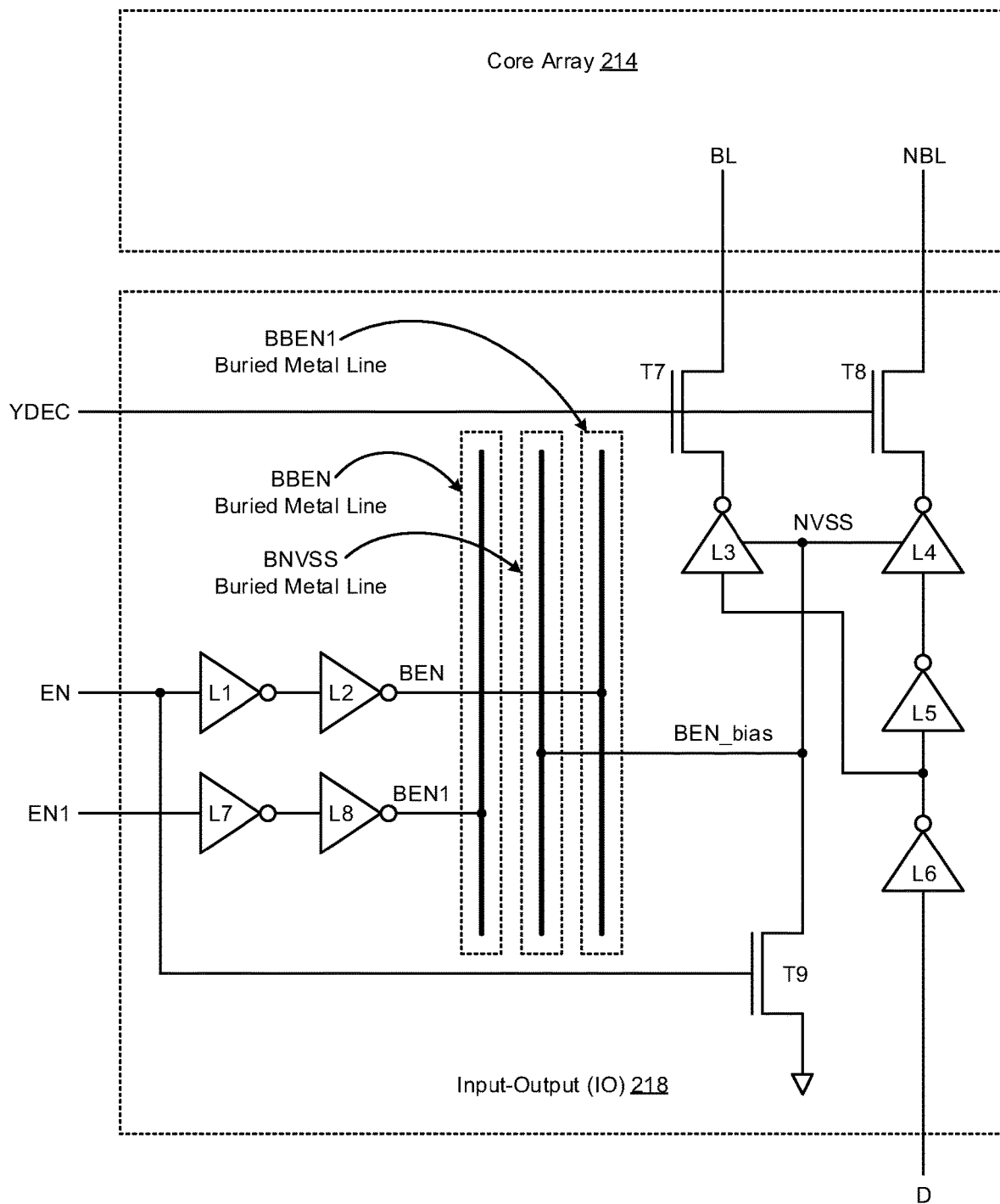

FIGS. 2A-2C illustrate various diagrams of buried metal architecture 204 that utilizes buried metal coupling capacitance between buried metal lines in accordance with various implementations described herein. In particular, FIG. 2A shows a diagram 200A of a buried metal architecture 204A with multiple buried metal lines (BBEN, BNVSS) in a first configuration, FIG. 2B shows another diagram 200B of a buried metal architecture 204B with multiple buried metal lines (BBEN, BNVSS) in a second configuration, and also, FIG. 2C shows another diagram 200C of a buried metal architecture 204C with multiple buried metal lines (BBEN, BNVSS, BBEN1) in a third configuration.

In some implementations, the bitcell architecture 204 may be implemented as a system or a device having various integrated circuit (IC) components that are arranged and coupled together as an assemblage or combination of parts that provide for physical circuit designs and various related structures. In some instances, a method of designing, providing and building the bitcell architecture 204 as an integrated system or device may involve use of various IC circuit components described herein so as to thereby implement fabrication schemes and techniques associated therewith. Further, the bitcell architecture 204 may be integrated with computing circuitry and related components on a single chip, and the bitcell architecture 204 may be implemented in various embedded systems for automotive, electronic, mobile, server and Internet-of-things (IoT) applications.

As shown in FIG. 2A, the bitcell architecture 204A may have a core array 214 of bitcells, such as, e.g., an array of multiple bitcells 104 as shown in FIG. 1. In addition, the bitcell architecture 204A may have input-output (10) circuitry 218 with transistors (T7, T8, T9) and logic gates (L1, L2, L3, L4, L5, L6) that are arranged and configured to transfer a data signal (D) to bitcells in the core array 214 via bitlines (BL, NBL) based on an enable signal (EN) and a write decoder signal (YDEC). In various applications, the enable signal (EN) may be passed through logic gates (L1, L2) to generate enable signal (BEN), which is used to temporarily generate a negative bias (BEN_bias) to ground connections (NVSS) of logic gates (L3, L4) by way of coupling capacitance. In some applications, logic gates (L3, L4) may be referred to as bitline drivers that are used to drive bitlines (BL, NBL) when passgate transistors (T7, T8) are activated by YDEC signal. Also, transistor (T9) may be coupled between NVSS and ground (VSS, GND), wherein transistor (T9) couples NVSS to ground (VSS, GND) when activated by the enable signal (EN). In various applications, the data signal (D) may be passed through logic gates (L6, L3) to drive the first bitline (BL), and also, the data signal (D) may be passed through logic gates (L6, L5, L4) to drive the second bitline (NBL), which is a complement to the first bitline (BL).

In some applications, transistors (T7, T8, T9) may be implemented with N-type MOS (NMOS) transistors. However, other configurations may be used to achieve similar results, behavior and/or characteristics. Also, in some applications, logic gates (L1, L2, L3, L4, L5, L6) may be implemented with inverters. However, various other configurations may be used to achieve similar results, behavior and/or characteristics.

As shown in FIG. 2A, the bitcell architecture 204A may include bitline drivers (L3, L4) that are coupled to passgates (T1, T6) of bitcells 104 (e.g., as shown in FIG. 1) via bitlines (BL, NBL). Also, the bitcell architecture 204A may have the buried metal lines (BBEN, BNVSS) that are formed within a substrate including a buried enable signal line (BBEN) and a buried ground line (BNVSS) that may be coupled to the ground connections (NVSS) of the bitline drivers (L3, L4). In some applications, the buried enable signal line (BBEN) may transfer a negative bias to a selected bitline of the bitlines (BL, NBL) via the buried ground line (BNVSS) that is coupled to ground connections (NVSS) of the bitline drivers (L3, L4) so as to increase the gate-source bias (or the gate-to-source bias) of the passgates (T1, T6) of the selected bitcell, e.g., to thereby enhance the write capability of the selected bitcell. As such, in some applications, this concept may be referred to as a write assist operation that uses buried metal coupling capacitance to temporarily generate a negative gate-to-source bias voltage at the passgates (T1, T6) of the selected bitcell so as to thereby enhance the write capability of the selected bitcell.

In various implementations, the buried metal lines (BBEN, BNVSS) are formed and/or disposed parallel to the bitlines (BL, NBL), and the buried enable signal line (BBEN) may be formed and disposed parallel to the buried ground line (BNVSS). As described herein, capacitive coupling from the buried metal lines (BBEN, BNVSS) to the bitlines (BL, NBL) may temporarily generate the negative gate-to-source voltage at the passgates (T1, T6) of the selected bitcell so as to improve writability of the selected bitcell. In various applications, the buried enable signal line (BBEN) is separate from the buried ground line (BNVSS), and during a write operation, the buried enable signal line (BBEN) may couple to the buried ground line (BNVSS) by way of buried metal coupling capacitance.

In various implementations, the buried enable signal line (BBEN) may provide an enable signal (BEN), and the buried ground line (BNVSS) may provide a ground signal (NVSS). During a write operation, a falling edge of the enable signal (BEN) may couple to the ground signal line (NVSS) by way of buried metal coupling capacitance, and also, the ground signal (NVSS) may transfer a negative bias to the selected bitline through the bitline driver (L3, L4) so as to increase gate-to-source bias of the passgate (T1, T6) of the selected bitcell to thereby enhance the write capability of the selected bitcell.

In various implementations, as shown in FIG. 2A, the bitcells in the core array 214 may be formed and disposed on the substrate above a portion 234 of the buried metal lines (BBEN, BNVSS) that are formed and/or disposed within the substrate underneath the bitcells in the core array 214. Also, in some instances, the bitline drivers (L3, L4) may be formed and/or disposed on the substrate in the input-output (IO) circuitry area above another portion 238 of the buried metal lines (BBEN, BNVSS) that are formed within the substrate underneath the bitline drivers (L3, L4). In various applications, the enable signal (EN) may be passed through logic gates (L1, L2) to generate enable signal (BEN), which is used to temporarily generate a negative bias (BEN_bias) to ground connections (NVSS) of logic gates (L3, L4) by way of coupling capacitance. Also, in various applications, logic gates (L3, L4) may be referred to as bitline drivers that are used to drive bitlines (BL, NBL) when passgate transistors (T7, T8) are activated by YDEC signal.

FIG. 2A shows an implementation of a write assist scheme using buried metal coupling that extends below the bitcell core array. The falling edge of BEN couples to the write driver ground signal (NVSS) through buried metal coupling capacitance, and then, the NVSS signal transfers an instant negative bias to the selected bitline (BL) through the bitline driver so as to increase gate-source bias of the selected bitcell passgate transistor to thereby enhance write capability.

In various implementations, as shown in FIG. 2B, the bitcells in the core array 214 may be formed and/or disposed on the substrate, and also, the bitline drivers (L3, L4) may be formed and/or disposed on the substrate within the input-output (IO) circuitry area above the buried metal lines (BBEN, BNVSS) that are formed and/or disposed within the substrate underneath the bitline drivers (L3, L4). In various applications, the enable signal (EN) may be passed through logic gates (L1, L2) to generate enable signal (BEN), which is used to temporarily generate a negative bias (BEN_bias) to ground connections (NVSS) of logic gates (L3, L4) by way of coupling capacitance. Also, in various applications, logic gates (L3, L4) may be referred to as bitline drivers that are used to drive bitlines (BL, NBL) when passgate transistors (T7, T8) are activated by YDEC signal.

FIG. 2B shows an implementation of a write assist scheme using buried metal coupling within memory 10. The falling edge of BEN couples to bitline driver ground signal (NVSS) through buried metal coupling capacitance. Limiting buried metal in memory 10 removes the manufacturability requirement of buried metal routing under the bitcell. Also, it may be possible to draw buried metals of varied lengths so as to provide various different coupling settings to achieve different negative bitline assist levels.

In various implementations, as shown in FIG. 2C, the buried enable signal line (BBEN) may include multiple buried enable signal lines (BBEN, BBEN1) including a first buried signal line (BBEN) and a second buried enable signal line (BBEN1). In various applications, when activated, the first buried enable signal line (BBEN) may provide a first level of coupling capacitance to the buried ground line (BNVSS), and when activated, the second buried enable signal line (BBEN1) may provide an added second level of coupling capacitance to the buried ground line (BNVSS) by boosting (or by adding to, or increasing by adding to) the first level. In some applications, the enable signal (EN) refers to multiple enable signals (EN, EN1), wherein the enable signal (EN) may be passed through logic gates (L1, L2) to generate a first enable signal (BEN) that is used to temporarily generate a negative bias (BEN_bias) to ground connections (NVSS) of logic gates (L3, L4) by way of coupling capacitance. Also, another enable signal (EN1) may be passed through logic gates (L7, L8) to generate a second enable signal (BEN1) that is also used to temporarily generate and boost the negative bias (BEN_bias) to ground connections (NVSS) of logic gates (L3, L4) by way of coupling capacitance. Also, in some instances, logic gates (L1, L2, L7, L8) may be implemented with inverters. However, various other configurations may be used to achieve similar results, behavior and/or characteristics.

FIG. 2C shows an implementation of a write assist scheme using buried metal coupling within the memory I/O with adjustable assist levels. So as to improve reliability, one way to avoid overshoot is to provide coupling capacitance between BEN and NVSS that is a monotonically increasing function of the capacitance of bitline. FIG. 2C shows a split of the coupling capacitance into multiple components, such as, e.g., one from BBEN and one from BBEN1. An example of control may be to configure EN and EN1 to toggle, where the bitline capacitance is low, and then disable EN1 from toggling. Thus, in some instances, negative bias generated on NVSS is lower and hence an appropriate voltage may be transferred to the bitline. Also, even though two EN signals are used, any number of digital steps (or EN signals) may be used to control coupling capacitance.

Figure 3:
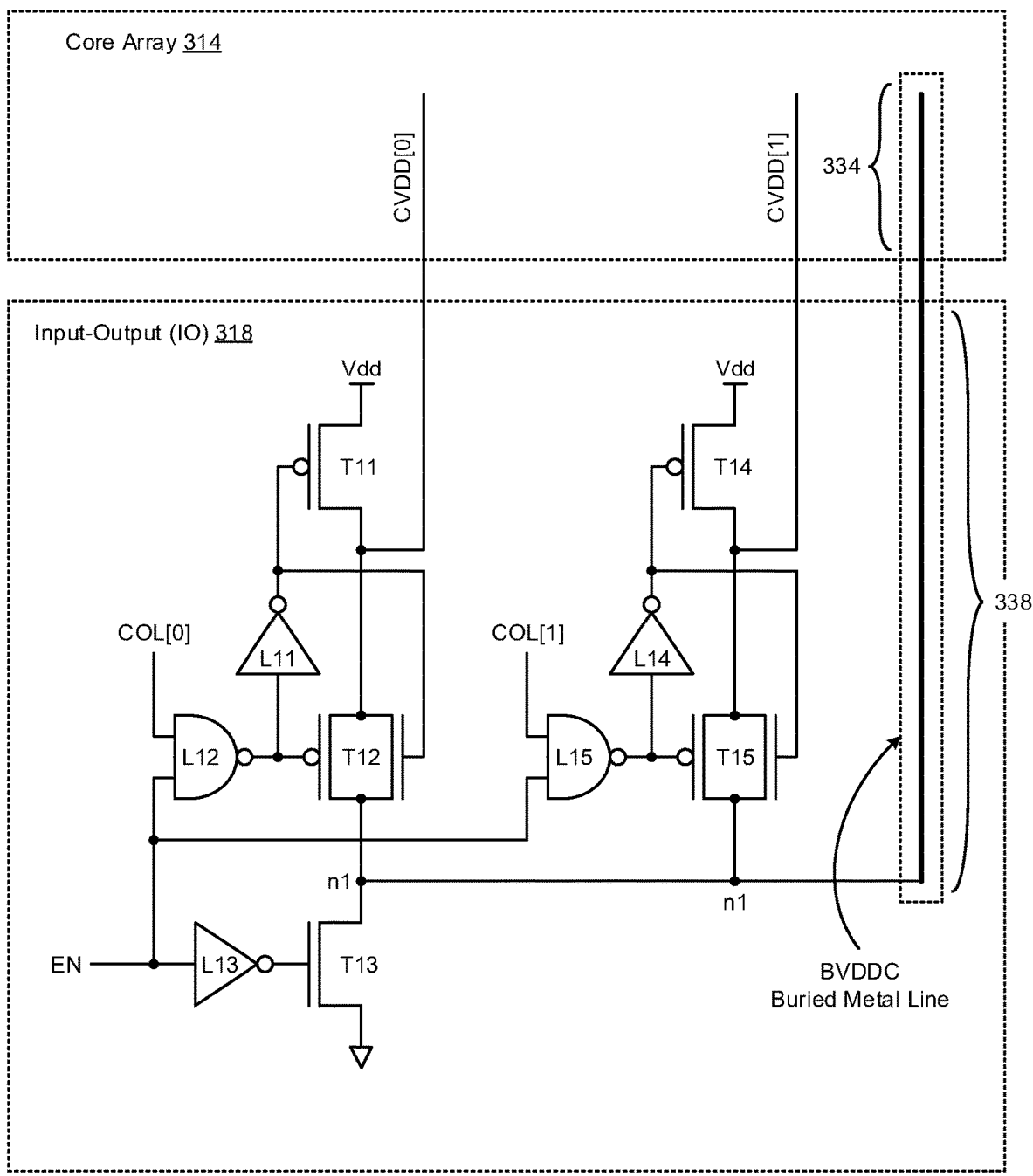
FIG. 3 illustrates a diagram of buried metal architecture that uses buried metal lines for bitcell voltage supply in accordance with implementations described herein.

FIG. 3 illustrates a diagram 300 of buried metal architecture 304 that utilizes a buried metal line (BVDDC) for bitcell voltage supply in accordance with implementations described herein. In various applications, the buried metal line (BVDDC) may be coupled to the bitcell power supply connections 114 of a bitcell 104, e.g., as shown in FIG. 1. In other applications, during a write operation, the buried metal line (BVDDC) may couple to power supply connections of the selected column of bitcells CVDD[0], CVDD[1] by way of charge sharing to temporarily bias a selected bitcell 104 to a lower supply voltage so as to thereby enhance write capability of the selected bitcell 104.

In some implementations, the bitcell architecture 304 may be implemented as a system or a device having various integrated circuit (IC) components that are arranged and coupled together as an assemblage or combination of parts that provide for physical circuit designs and various related structures. In some instances, a method of designing, providing and building the bitcell architecture 304 as an integrated system or device may involve use of various IC circuit components described herein so as to thereby implement fabrication schemes and techniques associated therewith. Further, the bitcell architecture 304 may be integrated with computing circuitry and related components on a single chip, and the bitcell architecture 304 may be implemented in various embedded systems for automotive, electronic, mobile, server and Internet-of-things (IoT) applications.

As shown in FIG. 3, the bitcell architecture 304 may have a core array 314 of bitcells, such as, e.g., an array of multiple bitcells 104 as shown in FIG. 1. In addition, the bitcell architecture 304 may have input-output (IO) circuitry 318 with transistors (T11, T12, T13, T14, T15) and logic gates (L11, L12, L13, L14, L15) that may be arranged and configured to supply voltage (VDDC) to bitcells in the core array 314 by way of the buried metal line (BVDDC) base don the enable signal (EN). Also, the bitcells in the core array 314 may be arranged in any number (N) of columns, wherein supply voltage CVDD[0] is provided to first selected column COL[0], or wherein supply voltage CVDD[1] is provided to second selected column COL[1] based on enable signal (EN) and a column selection signal COL[0] or COL[1]. Even though two columns are shown in FIG. 3 for simplicity, any number (N) of columns may be used to achieve similar results.

In some applications, in reference to the first column COL[0], transistors (T11, T12, T13) may be coupled in series between supply voltage (Vdd) and ground (Vss, Gnd), wherein transistor (T11) is coupled between supply voltage (Vdd) and multiple transistors (T12), and multiple transistors (T12) are coupled between transistor (T11) and transistor (T13), and also, transistor (T13) is coupled between multiple transistors (T12) and ground (Vss, Gnd). Also, the enable signal (EN) is provided to the gate of transistor (T13) by way of logic gate (L13), and the enable signal (EN) is provided to an input of logic gate (L12), and column selection signal COL[0] is provided to another input of logic gate (L12). Also, output of logic gate (L12) is provided to the gate of PMOS transistor of multiple transistors (T12), and the output of logic gate (L12) is also provided to the gate of transistor (T11) by way of logic gate (L11). Also, the output of logic gate (L11) is provided to the gate of an NMOS transistor of multiple transistors (T12).

In various applications, transistor (T11) may be implemented with P-type MOS (PMOS) transistor, and transistor (T13) may be implemented with N-type MOS (NMOS) transistor, and the multiple transistors (T12) may be implemented with PMOS and NMOS transistors coupled together as shown in FIG. 3. However, various other configurations may be used to achieve similar results, behavior and/or characteristics. Also, in various applications, logic gates (L11, L13) may be implemented with inverters, and also, logic gate (L12) may be implemented with a NAND gate. However, various other configurations may be used to achieve similar results, behavior and/or characteristics.

In some applications, in reference to second column COL[1], transistors (T14, T15) may be coupled in series between supply voltage (Vdd) and output node (n1), which may be disposed between multiple transistors (T12) and transistor (T13). Also, transistor (T14) is coupled between supply voltage (Vdd) and multiple transistors (T15), and multiple transistors (T15) are coupled between transistor (T14) and output node (n1), which may be coupled to the buried metal line (BVDDC). Also, the enable signal (EN) is provided to an input of logic gate (L15), and column selection signal COL[1] is provided to another input of logic gate (L15). The output of logic gate (L15) is provided to the gate of PMOS transistor of multiple transistors (T15), and the output of logic gate (L15) is also provided to the gate of transistor (T14) by way of logic gate (L14). The output of logic gate (L14) is provided to the gate of NMOS transistor of multiple transistors (T15).

In various applications, the transistor (T14) may be implemented with a PMOS transistor, and the multiple transistors (T15) may be implemented with PMOS and NMOS transistors coupled together as shown in FIG. 3. However, various other configurations may be used to achieve similar results, behavior and/or characteristics. Also, in various applications, logic gate (L14) may be implemented with an inverter, and also, logic gate (L15) may be implemented with NAND gate. However, various other configurations may be used to achieve similar results, behavior and/or characteristics.

As shown in FIG. 3, the bitcell architecture 304 may have memory (e.g., core memory 314) with an array of bitcells formed on a substrate, and the bitcell architecture 304 may have a buried metal line (BVDDC) that is formed within the substrate. Also, the bitcell architecture 304 may have input-output (10) logic 318 that supplies voltage to power supply connections 114 of the bitcells by way of the buried metal line (BVDDC). In some applications, the input-output (10) logic 318 supplies voltage to power supply connections CVDD[0], CVDD[1] of selected columns COL[0], COL[1] of bitcells based on the enable signal (EN) and the column select signal COL[0], COL[1]. Also, the input-output (10) logic supplies voltage to the power supply connections 114 of the bitcells and/or the columns COL[0], COL[1] of bitcells by way of the buried metal line (BVDDC) based on the enable signal (EN) and the column select signal COL[0], COL[1].

In various applications, the bitcells are formed and/or disposed on the substrate above a first portion 334 of the buried metal line (BVDDC), which is formed within the substrate underneath the bitcells. Also, the input-output (10) logic may be formed and/or disposed on the substrate above a second portion 338 of the buried metal line (BVDDC) that is formed within the substrate underneath the input-output logic 318.

FIG. 3 shows an implementation of a write assist scheme using buried metal (BVDDC) charge sharing with the column power supply connections (CVDD) for the columns COL[0], COL[1]. Also, this scheme uses the buried metal line (BVDDC) for metal coupling, and thus, this scheme does not use upper metal layers of the back-end-of-metal (BEOM) line for metal coupling, and in addition, this scheme maintains memory porosity over the memory core array region.

Figure 4A:
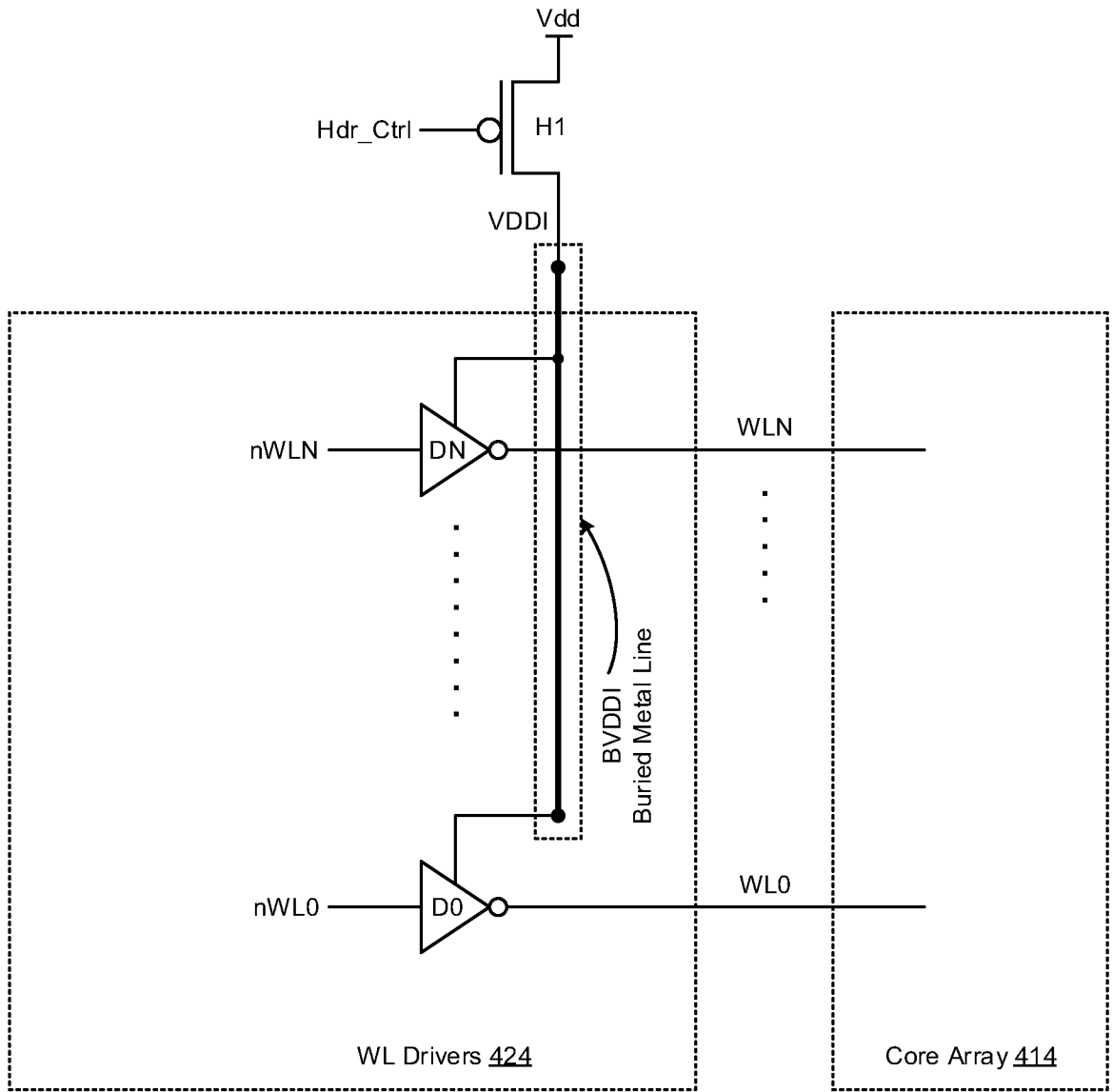
FIGS. 4A-4B illustrate various diagrams of buried metal architecture that uses buried metal lines for supplying voltage to power supply connections of wordline drivers in accordance with various implementations described herein.
Figure 4B:
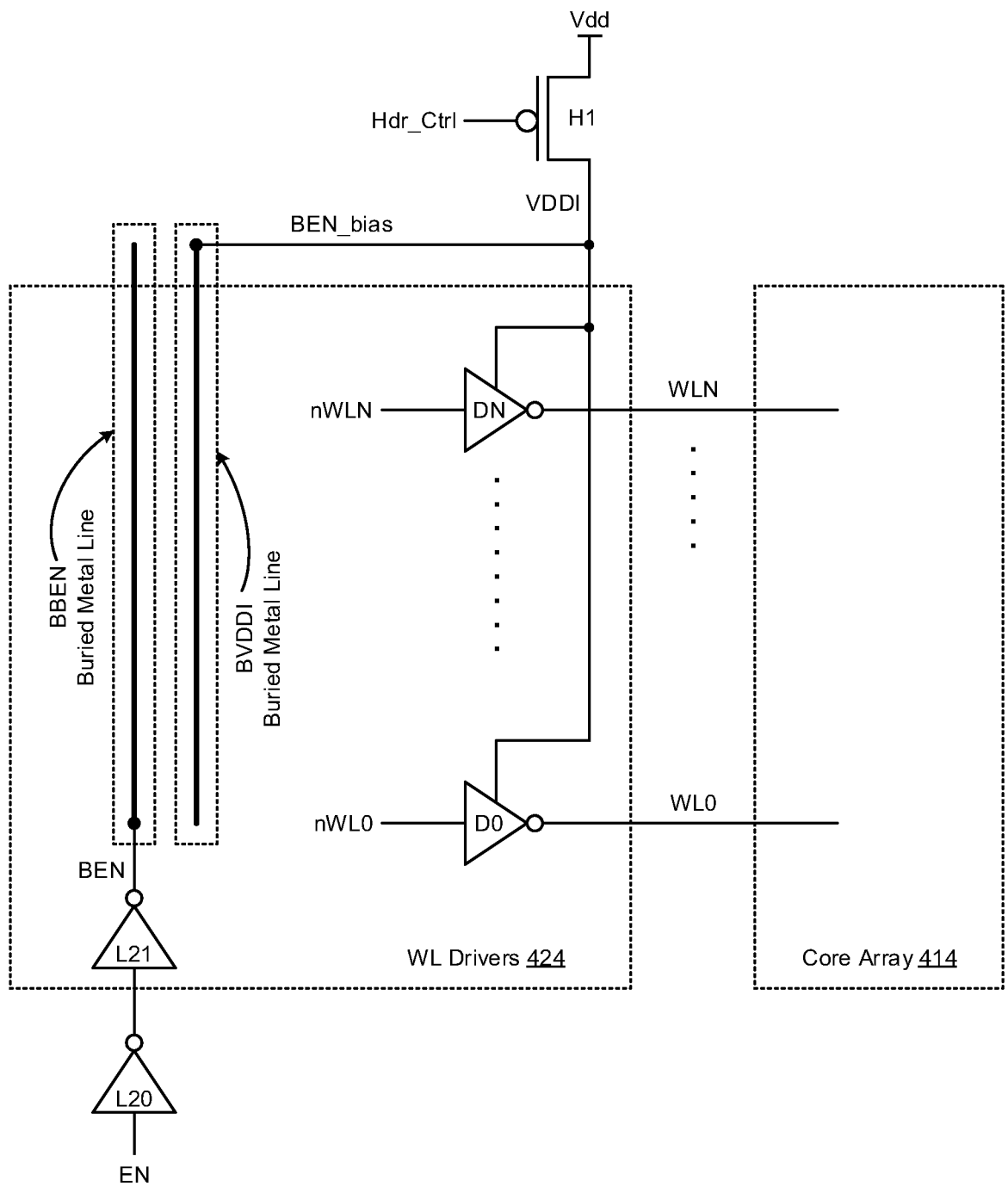

FIGS. 4A-4B illustrate various diagrams of buried metal architecture 404 that utilizes one or more buried metal lines (BDDI, BEN) for supplying voltage to power supply connections 118 of wordline drivers (WLDs) in accordance with various implementations described herein. In particular, FIG. 4A shows a schematic diagram 400A of a buried metal architecture 404A utilizing a buried metal line (BVDDI) in a first configuration, and FIG. 4B shows another schematic diagram 400B of a buried metal architecture 404B utilizing multiple buried metal lines (BEN, BVDDI) in a second configuration.

In some implementations, the bitcell architecture 404 may be implemented as a system or a device having various integrated circuit (IC) components that are arranged and coupled together as an assemblage or combination of parts that provide for physical circuit designs and various related structures. In some instances, a method of designing, providing and building the bitcell architecture 404 as an integrated system or device may involve use of various IC circuit components described herein so as to thereby implement fabrication schemes and techniques associated therewith. Further, the bitcell architecture 404 may be integrated with computing circuitry and related components on a single chip, and the bitcell architecture 404 may be implemented in various embedded systems for automotive, electronic, mobile, server and Internet-of-things (IoT) applications.

As shown in FIG. 4A, the bitcell architecture 404A may have a core array 414 of bitcells, such as, e.g., an array of multiple bitcells 104 as shown in FIG. 1. In addition, the bitcell architecture 404A may have wordline driver (WLD) circuitry 424 with a number (N) of wordline drivers (D0, . . . , DN) that are arranged and configured to select a bitcell for writing data to the selected bitcell in the core array 414 via wordlines (WL0, . . . , WLN) based on a header control signal (Hdr_Ctrl). In some applications, the bitcell architecture 404A may have header powergate transistor (H1) that is coupled between supply voltage (Vdd) and the power supply connections of the wordline drivers (D0, . . . , DN) by way of buried metal line (BVDDI). Also, in various applications, the header powergate transistor (H1) is configured to transfer the supply voltage (Vdd) as an applied voltage (VDDI) to the power supply connections of wordline drivers (D0, ..., DN) when activated by the header control (Hdr_Ctrl) signal, wherein the applied voltage (VDDI) is supplied to the wordline drivers (D0, ..., DN) by way of the buried metal line (BVDDI).

As shown in FIG. 4A, the bitcell architecture 404 may have the buried metal line (BVDDI) that is formed and/or disposed within a substrate, and the bitcell architecture 404 may have the wordline drivers (D0, ..., DN) that are coupled to the core array 414 of bitcells via the wordlines (WL0, ..., WLN). In some applications, the supply voltage (Vdd) may be coupled to the power supply connections of the wordline drivers (D0, ..., DN) via the buried metal line (BVDDI). Also, the core array 414 of bitcells may be formed and/or disposed on the substrate above the buried metal line (BVDDI) that is formed within the substrate. Also, in some applications, the wordline drivers (D0, ..., DN) may have inverter logic activated by first wordline signals (nWL0, ..., nWLN), and also, the wordline drivers (D0, ..., DN) may provide second wordline signals (WL0, ..., WLN) to the core array 414 of bitcells by way of the wordlines (WL0, ..., WLN) when activated.

In various implementations, the supply voltage (Vdd) may refer to a core supply voltage, and the substrate may have a buried power network (BPR) with a buried metal layer that is used to form the buried metal line (BVDDI), and the core supply voltage may be used to provide power to the power supply connections of the wordline drivers (D0, ..., DN) via the buried metal line (BVDDI) formed in the buried metal layer. Also, in various applications, coupling the power supply connections of the wordline drivers (D0, ..., DN) to the buried metal line (BVDDI) provides capacitive decoupling so as to mitigate dynamic voltage drop on the wordline drivers (D0, ..., DN), and coupling power supply connections of the wordline drivers (D0, ..., DN) to the buried metal line (BVDDI) improves access timing of the bitcells to thereby improve bitcell performance.

FIG. 4A shows an implementation of having a robust power supply of memory wordline drivers (VDDI) by routing the power supply in buried metal (BVDDI). In various instances, buried metal may have higher capacitance that may mitigate dynamic voltage IR drop on wordline drivers during wordline signal transition. This scheme may improve the memory performance through improvement in the wordline signal slope.

In some implementations, as shown in FIG. 4B, the bitcell architecture 404B may have logic gates (L20, L21) that may be coupled in series to receive the enable signal (EN) and provide the enable signal (BEN) to a first buried line (BBEN). As shown in FIG. 4B, the bitcell architecture 404B may have multiple buried metal lines including the first buried metal line (BBEN) and the second buried metal line (BVDDI). The first buried metal line (BBEN) may transfer a temporary boost to the second buried metal line (BVDDI) by way of conductive capacitance, which transfers the temporary boost to the wordline signal on a selected wordline of the wordlines (WL0, ..., WLN) so as to thereby increase gate-source bias (or gate-to-source bias) of the passgate of a selected bitcell to enhance write capability of the selected bitcell. In various applications, the capacitive coupling from the multiple buried metal lines (BBEN, BVDDI) to the wordlines (WL0, ..., WLN) by way of the power supply connections of the wordline drivers (D0, ..., DN) temporarily boosts the gate-source voltage (or gate-to-source bias) at the passgates of the selected bitcell so as to thereby improve writability of the selected bitcell. Also, in some applications, the first buried metal line (BBEN) is separate from the second buried metal line (BVDDI), and also, during a write operation, the first buried metal line (BBEN) couples to the second buried metal line (BVDDI) by way of buried metal coupling capacitance.

FIG. 4B shows an implementation of a write assist scheme using buried metal coupling that extends below the wordline driver region. The boost in wordline is generated by capacitive metal coupling between the buried write assist enable (BEN) signal and the buried wordline driver internal supply net (BVDDI). Also, in some instances, a temporary boost to the wordline signal may increase the gate-to-source bias of the selected bitcell passgate transistor so as to enhance the write capability of the selected bitcell.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be considered complex and/or time consuming, but would nevertheless be a routine undertaking of design, fabrication, and manufacture for those of ordinary skill having benefit of this disclosure.

Described herein are various implementations of a device having bitline drivers coupled to passgates of bitcells via bitlines along with buried metal lines formed within a substrate including a buried enable signal line and a buried ground line coupled to ground connections of the bitline drivers. The buried enable signal line transfers a negative bias to a selected bitline of the bitlines via the buried ground line that is coupled to the ground connections of the bitline drivers so as to increase gate-source bias of the passgates of the selected bitcell to thereby enhance write capability of the selected bitcell.

Described herein are various implementations of a device having memory with an array of bitcells formed on a substrate along with a buried metal line formed within the substrate. The device may have input-output logic that supplies voltage to power supply connections of the bitcells by way of the buried metal line.

Described herein are various implementations of a device having at least one buried metal line formed within a substrate along with wordline drivers coupled to an array of bitcells via wordlines. The device may include a supply voltage coupled to power supply connections of the wordline drivers via the buried metal line.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing refers to implementations of various techniques described herein, various other and further implementations may be devised in accordance with the disclosure herein, which may be determined by the claims that follow.

Although the subject matter has been described in language that is specific to various structural features and/or methodological acts, it is to be understood that subject matter defined in the appended claims is not necessarily limited to the specific features or acts described above. Rather, specific features and acts described above are disclosed as example forms of implementing the claims.

What is claimed is:

1. A device comprising:
   bitline drivers coupled to passgates of bitcells via bitlines; and
   buried metal lines formed within a substrate including a buried enable signal line and a buried ground line coupled to ground connections of the bitline drivers, wherein the buried enable signal line transfers a negative bias to a selected bitline of the bitlines via the buried ground line that is coupled to the ground connections of the bitline drivers so as to increase gate-source bias of the passgates of a selected bitcell to thereby enhance write capability of the selected bitcell.

2. The device of claim 1, wherein:
   the buried metal lines are disposed parallel to the bitlines, and
   the buried enable signal line is disposed parallel to the buried ground line.

3. The device of claim 1, wherein:
   capacitive coupling from the buried metal lines to the bitlines temporarily generates negative gate-to-source voltage at the passgates of the selected bitcell so as to improve writability of the selected bitcell.

4. The device of claim 1, wherein:
   the buried enable signal line is separate from the buried ground line, and
   during a write operation, the buried enable signal line couples to the buried ground line by way of buried metal coupling capacitance.

5. The device of claim 4, wherein:
   the buried enable signal line provides an enable signal,
   the buried ground line provides a ground signal,
   during the write operation, a falling edge of the enable signal couples to a ground signal line by way of buried metal coupling capacitance, and
   the ground signal transfers a negative bias to the selected bitline through a bitline driver so as to increase gate-source bias of a passgate of the selected bitcell to thereby enhance the write capability of the selected bitcell.

6. The device of claim 1, wherein:
   the bitcells are formed and disposed on the substrate above a portion of the buried metal lines formed within the substrate underneath the bitcells, and
   the bitline drivers are formed and disposed on the substrate above another portion of the buried metal lines formed within the substrate underneath the bitline drivers.

7. The device of claim 1, wherein:
   the bitcells are formed and disposed on the substrate, and
   the bitline drivers are formed and disposed on the substrate above the buried metal lines formed within the substrate underneath the bitline drivers.

8. The device of claim 1, wherein:
   the buried enable signal line includes multiple buried enable signal lines including a first buried enable signal line and a second buried enable signal line,
   when activated, the first buried enable signal line provides a first level of coupling capacitance to the buried ground line, and
   when activated, the second buried enable signal line provides a second level of coupling capacitance to the buried ground line by boosting the first level.

9. A device comprising:
   memory having an array of bitcells formed on a substrate;
   a buried metal line formed within the substrate; and
   input-output logic coupled to the buried metal line, wherein:
      the input-output logic is configured to selectively supply voltage through the buried metal line to power supply connections of selected bitcells of the array,
      the input-output logic comprises logic gates configured to generate an enable signal, and
      the input-output logic selectively supplies voltage through the buried metal line based on the enable signal.

10. The device of claim 9, wherein:
    the input-output logic supplies voltage to selected columns of the bitcells based on the enable signal and a column select signal,
    the input-output logic supplies voltage to the power supply connections of the bitcells by way of the buried metal line based on the enable signal and the column select signal, and during a write operation, the buried metal line couples to the power supply connections of the selected columns of bitcells by way of charge sharing to temporarily bias the selected bitcell to a lower supply voltage so as to thereby enhance write capability of the selected bitcell.

11. The device of claim 10, wherein:
the bitcells are disposed on the substrate above a first portion of the buried metal line formed within the substrate underneath the bitcells, and
the input-output logic is disposed on the substrate above a second portion of the buried metal line formed within the substrate underneath the input-output logic.

12. The device of claim 9, wherein the input-output logic supplies voltage to the power supply connections of the selected bitcells via metal coupling of the buried metal line.

13. The device of claim 9, wherein the input-output logic is configured to selectively supply voltage through the buried metal line to power supply connections of the selected bitcells based on a column selection signal.

14. The device of claim 9, wherein:
the buried metal line is coupled to power supply connections of word-line drivers; and
the word-line drivers are configured to selectively supply voltage to the selected bitcells through corresponding word-lines.

* * * * *